United States Patent [19]

Kaneda et al.

[11] Patent Number: 5,323,094
[45] Date of Patent: Jun. 21, 1994

[54] METHOD OF STARTING A SENSORLESS MULTIPHASE DC MOTOR

[75] Inventors: Isao Kaneda, Moriyama; Hiromasa Fujii, Nijyo, both of Japan

[73] Assignee: Nippon Densen Corporation, Kyoto, Japan

[21] Appl. No.: 22,053

[22] Filed: Feb. 24, 1993

[30] Foreign Application Priority Data

Feb. 24, 1992 [JP] Japan .................................. 4-36160
Apr. 16, 1992 [JP] Japan .................................. 4-96209

[51] Int. Cl.$^5$ ............................................ H02K 23/00
[52] U.S. Cl. ................................... 318/254; 318/439; 318/138
[58] Field of Search ................... 318/439, 254, 138

[56] References Cited

U.S. PATENT DOCUMENTS

| | | | |
|---|---|---|---|
| 4,472,664 | 9/1984 | Chung | 318/254 |
| 5,001,405 | 3/1991 | Cassat | 318/254 |
| 5,124,604 | 6/1992 | Swartz | 318/254 |

FOREIGN PATENT DOCUMENTS 0495611  7/1992  European Pat. Off. .

*Primary Examiner*—William M. Shoop, Jr.
*Assistant Examiner*—Karen Masih
*Attorney, Agent, or Firm*—McCormick, Paulding & Huber

[57] ABSTRACT

In a sensorless multiphase dc motor which is started by repeating a sequence of steps in order to supply the stator with a series of discrete currents for rotating the rotor in a desired direction, the start-up sequence has a step(s) of conducting a magnetizing shift action by changing the flow of current from one direction to the reverse direction or vice versa thus reducing its time consumption and also, each of the plural phase coils is energized with a high amplitude of current to produce a higher torque thus enhancing the start-up characteristics of the motor.

In particular, the magnetizing shift action from one direction to the reverse direction or vice versa is conducted multiple times in each of the plural phase coils during the start-up sequence and the start-up sequence itself is repeated multiple times. As the result, the start-up characteristics of the motor will be more enhanced.

13 Claims, 10 Drawing Sheets

PREPARATORY MAGNITIZING

REVERSE MAGNITIZING

PREPARATORY MAGNITIZING     REVERSE MAGNITIZING

PREPARATORY MAGNITIZING     REVERSE MAGNITIZING

FIRST-PHASE REVERSE MAGNETIZING

Q2:ON
Q5:ON
OTHERS:OFF
STARTUP SOURCE
OUTPUT:+3V

PREPARATORY MAGNETIZING

Q1:ON
OTHERS:OFF
STARTUP SOURCE
OUTPUT:0V

METHOD OF STARTING A SENSORLESS MULTIPHASE DC MOTOR

BACKGROUND OF THE INVENTION

The present invention relates to a method of starting a sensorless multiphase direct-current motor, e.g. a brushless multiphase dc motor of sensorless type for use as a spindle motor in a magnetic-disk drive apparatus, having improved start-up characteristics for commencing the rotation of the rotor in a given direction.

DESCRIPTION OF THE PRIOR ART

In general, a brushless dc motor is employed as a spindle motor for a magnetic-disk drive apparatus, which comprises a stator for generating a magnetic field in a magnetizing state and a rotor magnet for producing a rotating force through electromagnetic interactions with the stator. The rotating movement of such a conventional brushless dc motor is commonly controlled by an electronic circuit applied in the form of a semiconductor chip.

FIG. 10 is a waveform diagram showing three coil currents iu,iv,iw of a three-phase brushless dc motor. As shown, a series of step motions is conducted by feeding the stator with discrete drive currents. More specifically, the rotor rotates in a desired direction as each coil is energized at intervals by a pulsed input for forward, stop, and reverse magnetizing actions in synchronization with the other coils.

The attraction and repulsion between an electromagnet and a permanent magnet creates a motive torque for driving the motor. The timing of producing such a motive torque is determined through detection of the rotating position of the rotor magnet. In reality, a set of Hall sensors has been used as a means for detecting the rotating position. For betterment, a sensorless type of the dc motor responsive to coil induction voltages is now introduced to meet the demand for minimizing the overall motor dimension.

In the traditional sensorless type dc motor, the magnitude of torque is proportional to the amplitude of current and to the variation in magnetic flux density. It is then apparent that the torque is increased by increasing the current or magnetic flux density variation.

However, a first disadvantage of the traditional sensorless type dc motor resides in the existence of a pause period in shifting of magnetization from one direction to the other. During the pause period, residual magnetism is substantially restored thus lowering the bipolar effect particularly in low-speed startup action.

Also, a second disadvantage is that an induction voltage which is generated by the action of a magnetic flux appearing across the coil and commonly used for control of the rotating movement of the sensorless motor, is absent when the rotor remains stationary and in addition, the polarity of the rotor magnet is being undetected. Accordingly, the motor which may rotate at steps without control signals in the initial stage will fail to start due to too low torque if its rotating position is unfavorable or will be rotated in the opposite direction by a reverse torque generated with the energizing stage.

For ensuring the reliability of the start-up action, such step motions are repeated, a double-drive method is employed, or both are used in combination. One of the double-drive methods is disclosed in European Patent Application Serial No. 92300284.4(0495611), in which the start-up torque in a motor is increased by determining an initial level of energizing input, shifting the flow of current instantly with no interval of zero-current period, and magnetizing in the reverse direction. This causes the magnetic flux density variation to increase thus producing a higher motive torque.

If the motor is started with its rotor being located at such an angle to the stator that the energization to coils produces no torque, the rotor remains unactuated and the same sequence of start-up steps has to be repeated. For rotating the rotor in a desired direction, the start-up steps are divided into e.g. two procedure groups. It is thus needed to have a detection mode period between the two procedure groups in order to avoid carrying out the steps of the second procedure immediately after the steps of the first procedure. As the result, the start-up sequence is increased in time consumption and has to be controlled with an appropriate manner for carrying out the entire steps in an order. This will also require a more sophisticated program for executing a sequence of the start-up steps.

When only one of the coils enables to generate a high torque in one direction during the second start-up procedure of such a double-drive system, as shown in FIG. 11, the resultant motive torque will remain too low.

SUMMARY OF THE INVENTION

It is a first object of the present invention to provide a method of starting a sensorless multiphase dc motor in which a sequence of start-up procedure is minimized in length by assigning a magnetizing shift action from a forward direction to a reverse direction or from a reverse direction to a forward direction to a given step of the start-up procedure.

It is a second object of the present invention to provide a method of starting a sensorless multiphase dc motor in which the start-up characteristics are enhanced by supplying multiple phase coils with high level magnetizing input to produce a high motive torque.

It is a third object of the present invention to provide a method of starting sensorless multiphase dc motor in which the start-up characteristics are multiply or accumulatively enhanced by having a plurality of magnetizing shift actions from one direction to the reverse direction or vice versa in each of the multiple phase coils during the startup procedure and repeating the start-up procedure multiple times.

The foregoing and other objects and features of the present invention will be apparent from the following description explained in conjunction with the accompanying drawings.

BRIEF DESCRIPTION OF THE DRAWINGS

FIG. 9A is an explanatory view of the preparatory magnetizing stage and FIG. 9B is an explanatory view of the magnetizing shift stage on one phase;

DETAILED DESCRIPTION OF THE PREFERRED EMBODIMENTS

The present invention will be described in more detail referring to the accompanying drawings.

A first embodiment of the present invention will be explained in the form of a method of starting a sensorless multiphase dc motor in conjunction with FIG. 1.

The sensorless multiphase dc motor of the first embodiment is a spindle motor for use in e.g. a magnetic-disk drive apparatus. Generally, the spindle motor comprises a stator for generating a magnetic field while being magnetized and a rotor for producing a rotating force through electromagnetic interaction with the stator. In the action, the rotor of the motor is rotated in one direction by repeating a series of start-up steps in which three phase windings or coils of the stator are energized with discrete magnetizing currents respectively. Particularly, the start-up step period of each magnetizing current to energize the coil of the stator contains at least one or more of magnetizing shift actions executed by changing the flow of the current from a forward direction to a reverse direction or from the reverse direction to the forward direction directly with giving no interval of zero-current period.

Figure 1:
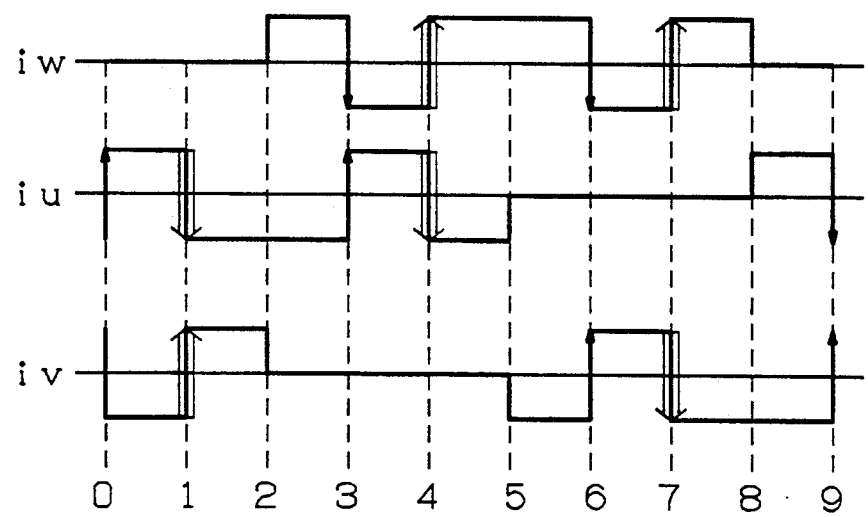
FIG. 1 is a waveform diagram of magnetizing currents according to a first embodiment of the method of starting a sensorless multiphase dc motor of the present invention.

More specifically, a high amplitude start-up current for double-drive function is supplied to each of the coils at a start-up procedure equivalent to the first step period of the foregoing conventional method, as shown in FIG. 1 and the start-up procedure will thus be attributed to the double-drive method.

As shown in FIG. 1, a current iu is supplied to the U-phase coil to make a magnetizing shift action to a positive direction at Step 0 and a full amplitude reverse shift to a negative direction at Step 1 thus producing a high start-up torque. Also, a further full amplitude shift to the negative direction is carried out at Step 4.

Similarly, a current iv to the V-phase coil produces a full amplitude shift to the positive direction at Step 1 and a full amplitude shift to the negative direction at Step 7. A current iw to the W-phase coil creates a couple of full amplitude shifts to the positive direction at Steps 4 and 7.

During the start-up procedure period corresponding to the first step period of the conventional method, each coil of the stator is supplied with a high amplitude start-up current which conducts a start-up sequence equivalent to the first step period of the conventional method for starting the motor.

The full amplitude shift of the start-up current occurs two times in each coil. Also, the two, U and W, phase coils are activated with their respective full amplitude shifts simultaneously at Step 1 and the V and W phase coils are magnetized at the same time at Step 7, whereby a resultant start-up torque will be increased during the first step period.

The timing of executing a magnetizing shift action and maintaining a peak hold period at the highest level can properly be controlled by summing a plurality of clock signals of different frequency, providing a delay time with a timer, or executing their combination.

According to the method of starting a sensorless multiphase dc motor of the present invention, the first step period contains a plurality of magnetizing shifts for multiple phases so that its time consumption is minimized and the start-up of the motor becomes fast.

Also, the first step procedure is conducted by one single stage of control thus contributing to the simplicity of a start-up control circuit of the sensorless multiphase dc motor.

A second embodiment of the method of starting a sensorless multiphase dc motor according to the present invention will now be described referring to FIGS. 2 and 3.

In this embodiment, the sensorless multiphase dc motor is employed as a spindle motor of a magnetic-disk drive apparatus equal to that of the first embodiment, which comprises a stator for generating a magnetic field while being magnetized and a rotor for producing a motive force through electromagnetic interaction with the stator.

Like the first embodiment, the motor is started when discrete magnetizing currents are supplied to three phase coils of the stator respectively in a predetermined sequence for rotating the rotor in a desired direction through step movements. Similarly, two of the phase coils are energized for magnetizing shift action in the start-up procedure. But the second embodiment is differed from the first embodiment by the fact that the full amplitude shift of current for producing high torque occurs one time in the same start-up period and also, the third phase coil is energized together with the initial two phase coils at a preparatory magnetizing stage prior to the magnetizing shift action.

Figure 2:
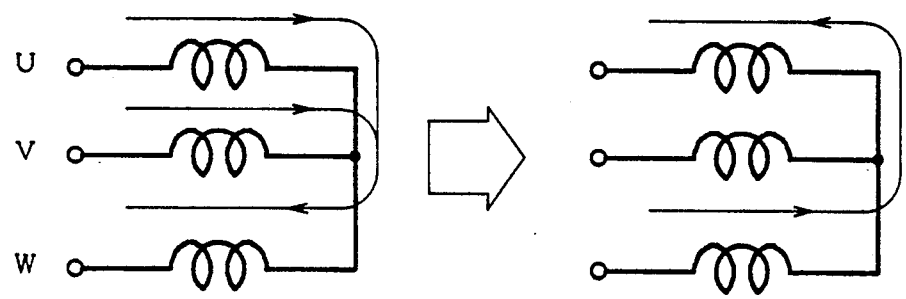
FIG. 2 is an explanatory view of energizing directions according to a second embodiment of the method of starting a sensorless multiphase dc motor of the present invention.

For example, the U and V phase coils are energized in one direction at the preparatory magnetizing stage as shown in FIG. 2 while the W phase coil is energized in the opposite direction. At the magnetizing shift stage, the U coil is energized in the opposite direction and the W coil is energized in the same direction as of the U and V coils at the preparatory stage, while the V coil remains deenergized.

The dead point at the preparatory magnetizing stage represents a point where electromagnetic forces of the three phase coils to the rotor are balanced. The dead point at the magnetizing shift stage is a point where electromagnetic forces to the rotor are balanced between the U phase coil and the W phase coil. Accordingly, the number of the coils producing motive forces to rotate the rotor at the preparatory magnetizing stage is different from that of the magnetizing shift stage. More particularly, the dead point at the preparatory magnetizing stage does not coincide with that of the magnetizing shift stage and the starting of the motor will highly be guaranteed. Also, the resultant start-up torque will be increased as compared with the generation of high torque with the use of one phase coil.

As set forth above, the method of starting a sensorless multiphase dc motor of the second embodiment allows all of the phase coils to be energized at the preparatory magnetizing stage and two of the phase coils to be energized at the magnetizing shift stage. Accordingly, full amplitude shifts of current are generated on the multiple phase coils and a resultant start-up torque will thus be increased. As the result, stalling of the rotor at the start-up will be eliminated.

Figure 3:
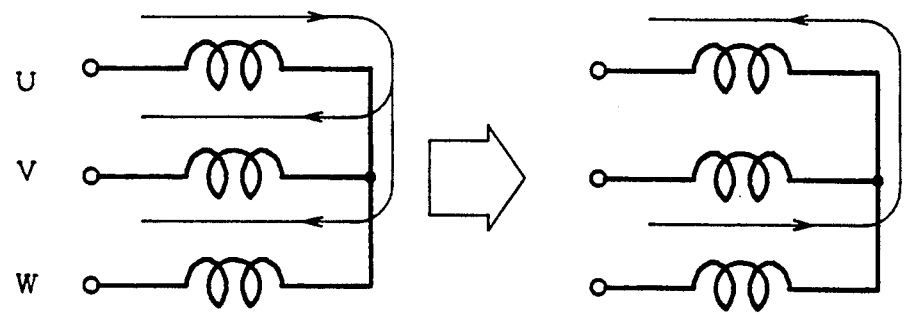
FIG. 3 is an explanatory view of another pattern of the energizing directions of the second embodiment.

FIG. 3 shows a modification of the second embodiment of the present invention. In action, the V and W phase coils are energized in the same direction while the U phase coil is energized in the opposite direction at the preparatory magnetizing stage. At the magnetizing shift stage, the U and W coils are energized in the directions reverse to those of the preparatory stage. Accordingly, the two, U and W, phase coils have full amplitude shifts thus producing a high start-up torque.

A third embodiment of the method of starting a sensorless multiphase dc motor according to the present invention will be described referring to FIGS. 4 to 6.

The sensorless multiphase dc motor of the third embodiment is also a spindle motor for use in a magnetic-disk drive apparatus and will be started by repeating multiple times a start-up procedure in which the stator is magnetized. During the start-up procedure, a given number of magnetizing shift actions caused by changing the flow of current from a forward direction to a reverse direction or vice versa with giving no interval of zero-current period are executed in each of the multiple phase coils.

Figure 4:
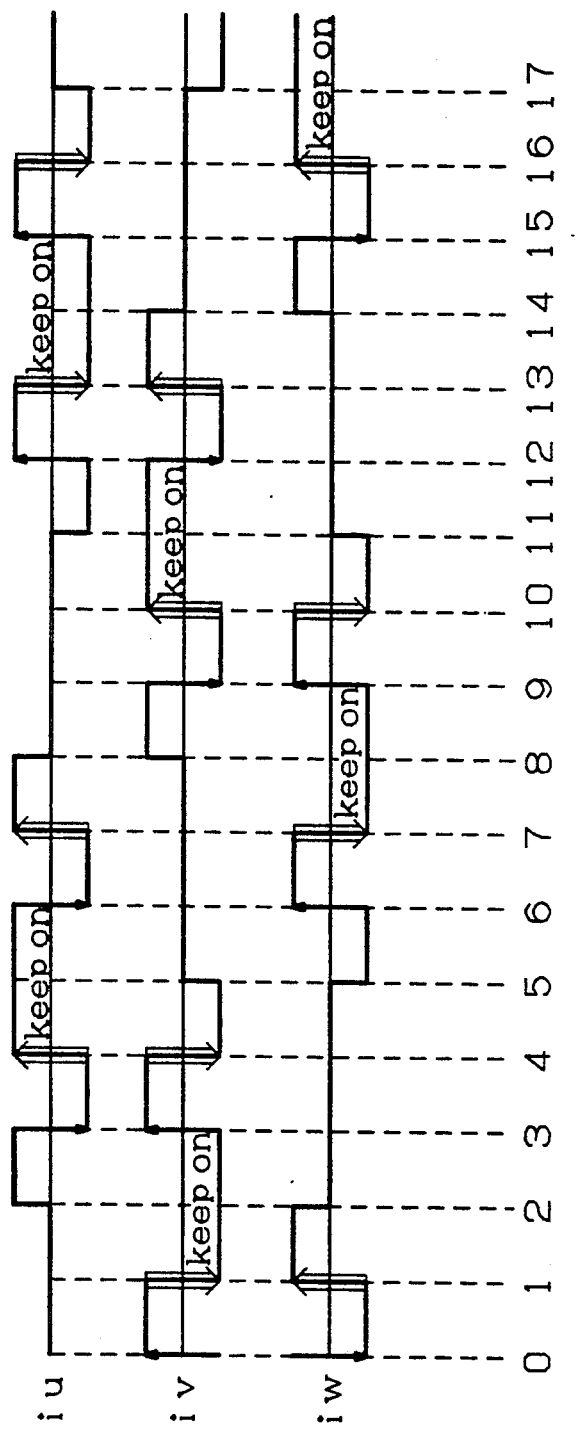
FIG. 4 is a waveform diagram of magnetizing currents according to a third embodiment of the method of starting a sensorless multiphase dc motor of the present invention.

For example as shown in FIG. 4, a current iu to the U-phase coil has a sharp decay to the negative peak at Step 3 and at Step 4, makes a peak-to-peak rise or full amplitude shift to the positive value thus creating a high torque. Also, it has a full amplitude shift to the positive value at Step 7 and makes two downward shifts at Steps 13 and 16 respectively for producing higher torque.

Similarly, a current iv to the V-phase coil has two full amplitude shifts to the negative value at Steps 1 and 4 and two full amplitude upward shifts to the positive value at Steps 10 and 13. Also, a current iw to the W-phase coil contains two full upward shifts to the positive value at Steps 1 and 16 and two downward shifts to the negative value at Steps 7 and 10.

As the three phase coils are energized four times with their respective full value currents during the start-up procedure which is equivalent to the first step period of the conventional manner, a resultant start-up torque produced in the procedure will be increased thus to ensure the starting of the motor.

In addition, two of the different phase coils are energized simultaneously and also, in the opposite directions at each of the full amplitude shift steps; for example, the V and W phase coils at Step 1, the U and V coils at Step 4, and the U and W coils at Step 7. Accordingly, the motor can be started within a shorter duration of the start-up procedure. It was found through experimental measurements that the start-up torque was increased to about 1.7 times by supplying one phase coil with a series of full amplitude shifts and to about 3 times by supplying two of the phase coils simultaneously with opposite shifts.

Figure 5:
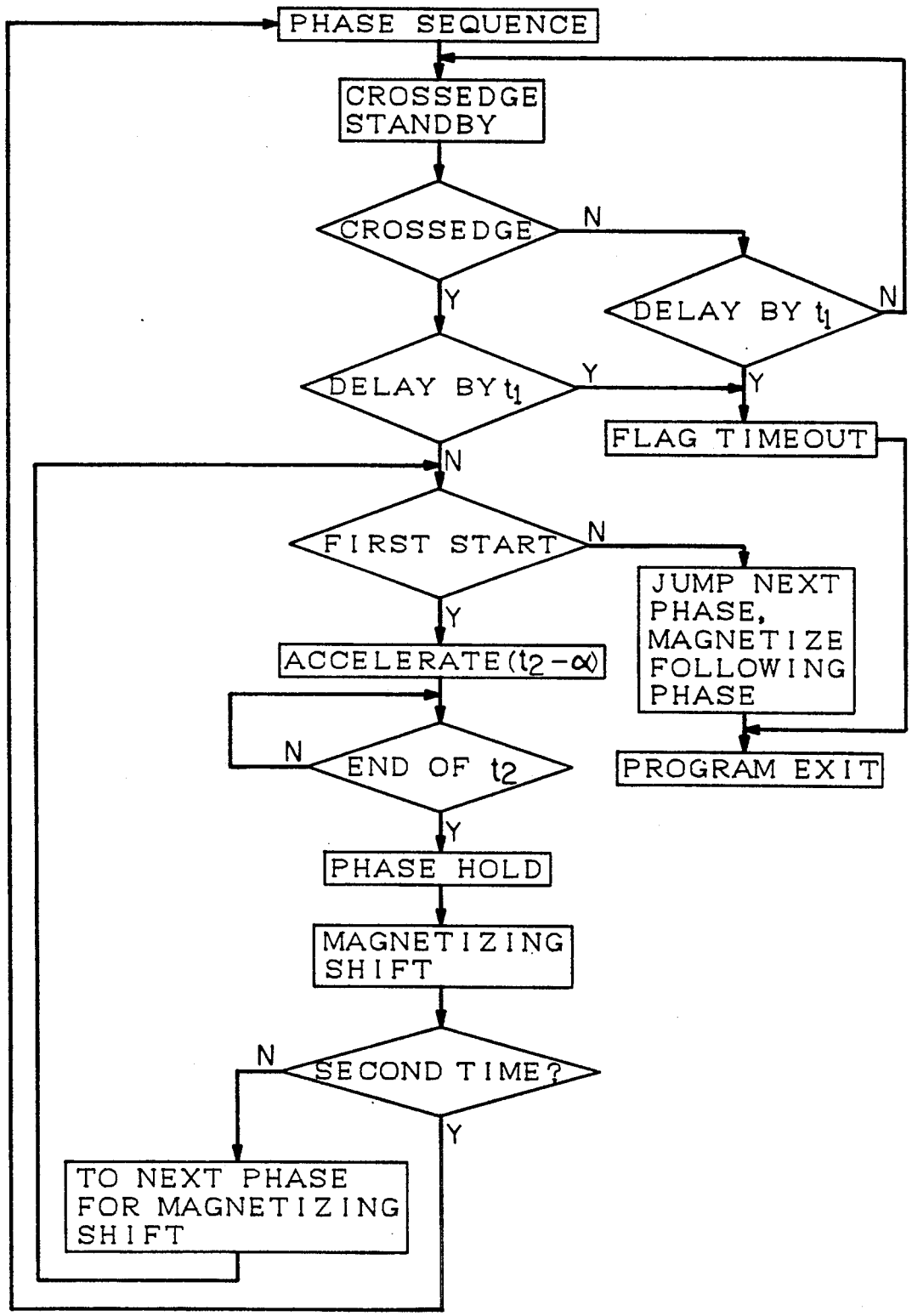
FIG. 5 is a flow chart showing the start-up procedure of the third embodiment.
Figure 6:
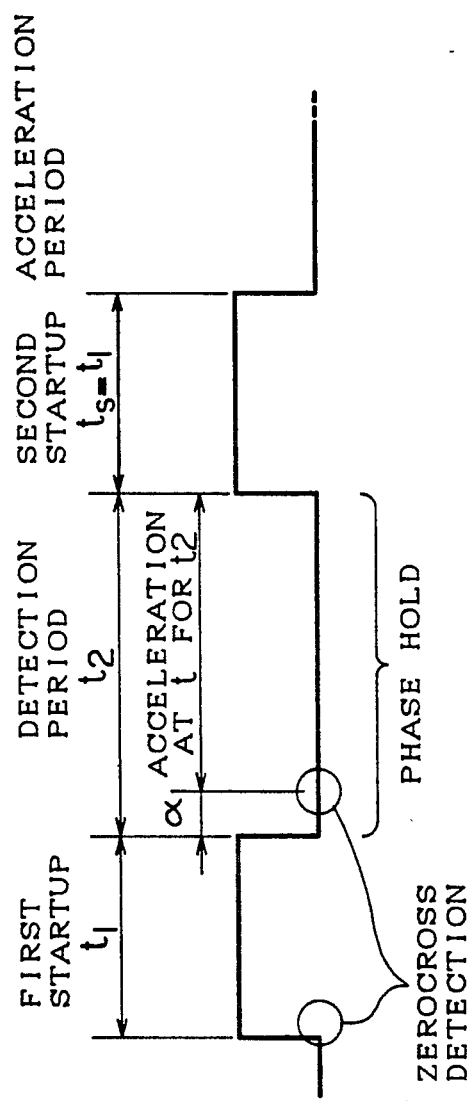
FIG. 6 is an explanatory view showing a start-up sequence of the third embodiment.

The duration of holding or keeping the maximum value of a current and the timing of making a magnetizing shift action are determined by a specific start-up flow chart, shown in FIG. 5, which carries out a phase sequence of first start-up, detection, second start-up, and acceleration periods as shown in FIG. 6 and is provided with a subroutine loop for restarting the first start-up after the end of the second start-up and a loop for repeating the second start-up upon finishing the same.

As set forth above, the method of starting a sensorless multiphase dc motor of the third embodiment allows the start-up procedure of having a number of full magnetizing shift actions on the stator to be repeated multiple times for ensuring the starting of the motor. The start-up reliability and energy saving on the motor will thus be increased.

Also, a predetermined number of the magnetizing shift actions caused by changing the flow of current from a forward direction to a reverse direction or vice versa are assigned to each of the multiple phase coils in the start-up procedure so that the electromagnetic properties of the magnetic material or stator can be enhanced for giving optimum performance to increase the start-up torque. Accordingly, the start-up procedure will be completed in a shorter period of time and the motor will thus be promptly started with a higher torque.

More particularly, a process of releasing energy stored and intensified on the stator by the magnetizing shift actions as a high torque is repeated multiple times in a minimum duration. The amplitude of magnetizing currents remains unchanged while the start-up torque is increased, thus contributing to the small size and low temperature generation of a drive circuit of the motor. If the motor is a low-torque starting type, the start-up currents can be minimized to meet the requirement of small motive torque.

A fourth embodiment of the method of starting a sensorless multiphase dc motor according to the present invention will now be described referring to FIG. 7.

The sensorless multiphase dc motor of the fourth embodiment is a spindle motor of a magnetic-disk drive apparatus which is started by repeating a start-up procedure of supplying the stator with a series of currents for rotating the rotor in a desired direction. The start-up procedure contains full magnetizing shift actions caused by changing the flow of current from one direction to the reverse direction or vice versa with no interval of zero-current period. The fourth embodiment permits the amplitude of a magnetizing current for magnetizing shift action in the start-up procedure to be varied.

Figure 7:
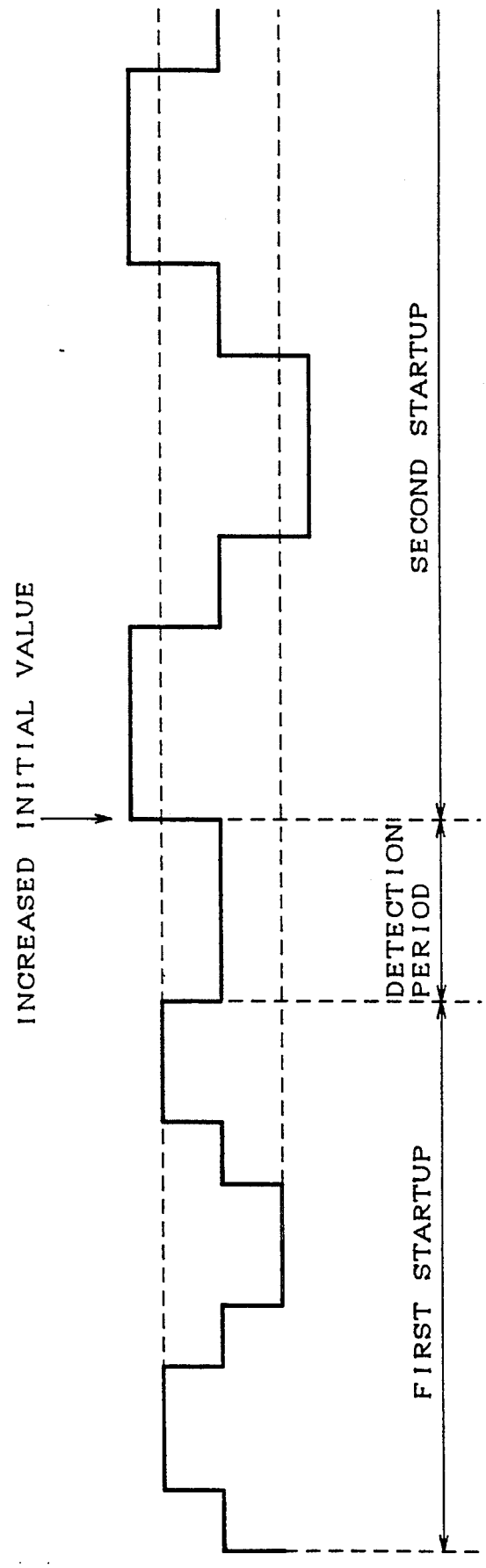
FIG. 7 is a waveform diagram of magnetizing currents according to a fourth embodiment of the method of starting a sensorless multiphase dc motor of the present invention.

As best shown in FIG. 7, the rated current sensitivity of each coil is varied; a low level of current is introduced in the first start-up period for limiting the magnetizing energy and its initial value is increased in the second start-up period which follows the detection period for producing a greater torque than that of the first start-up period. In action, the motor is rarely rotated in a reverse direction and remains unmoved in the first start-up period. The motor is then rotated with the current of increased level at the second start-up period.

The rated current sensitivity to the coil may be determined with the use of a current sensor, a timer, and an adder. More specifically, the sensitivity of the current sensor is changed with the adder in a given period determined by the timer; for example, a current of 0.1 A is read as 0.5 A or a higher value may be used.

As set forth above, the method of starting a sensorless multiphase dc motor of the fourth embodiment allows the magnetizing energy to be controlled to a low level in the first start-up period and then, increased to a high level in the second start-up period for producing a greater start-up torque, as compared with repeating of the start-up procedure with the same amplitude of current of the first, second, or third embodiment. Accordingly, the starting reliability will be increased similar to the first, second, and third embodiments. Also, the rotation in a reverse direction at the start-up procedure will be prevented or the reverse angle will be minimized. This contributes to the elimination of head crush and head sticking on the magnetic-disk drive apparatus and of damage to a magnetic disk or recording medium.

A fifth embodiment of the method of starting a sensorless multiphase dc motor according to the present invention will be described referring to FIGS. 8, 9A, and 9B.

The sensorless multiphase dc motor of the fourth embodiment is also a spindle motor for use in a magnetic-disk drive apparatus, which is started by repeating a start-up procedure of supplying the stator with a series of magnetizing currents for rotating the rotor in a desired direction.

In the fifth embodiment like the fourth embodiment, the amplitude of magnetizing currents is varied in repeating the start-up procedure for making magnetizing shift actions. However, the fifth embodiment is differed from the fourth embodiment by the fact that the neutral point of the three phase coils is coupled by a diode to a start-up power source.

Figure 8:
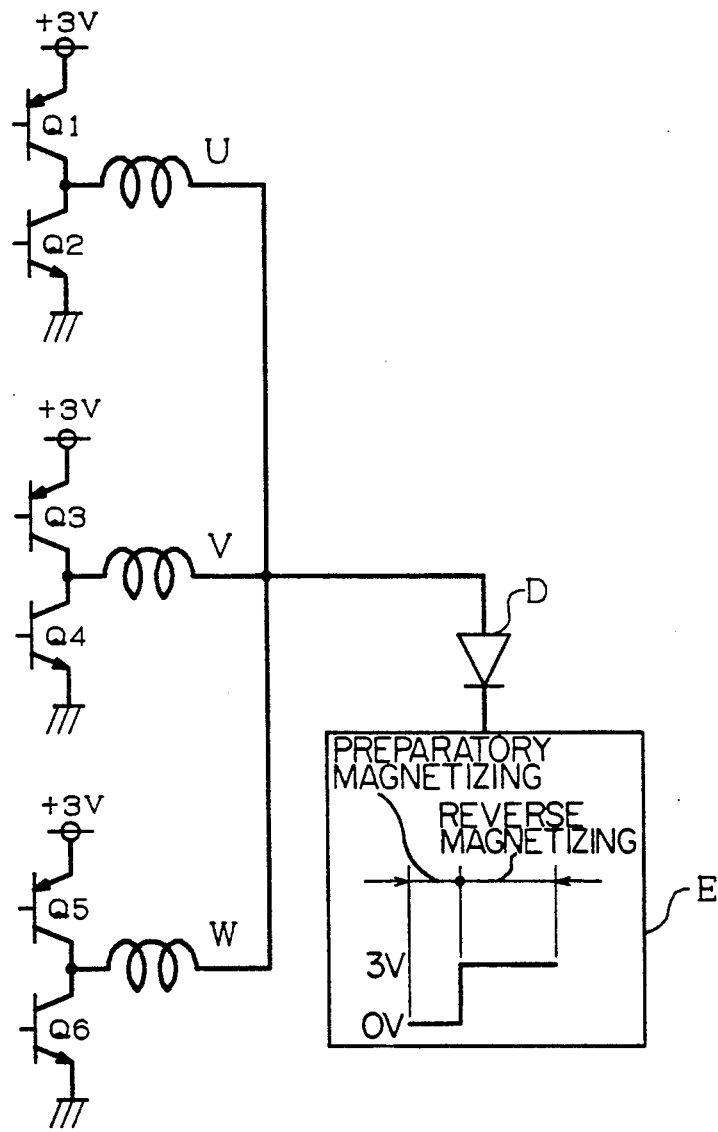
FIG. 8 is a wiring diagram of the primary part of an energizing circuit according to a fifth embodiment of the method of starting a sensorless multiphase dc motor of the present invention.
Figure 9B:
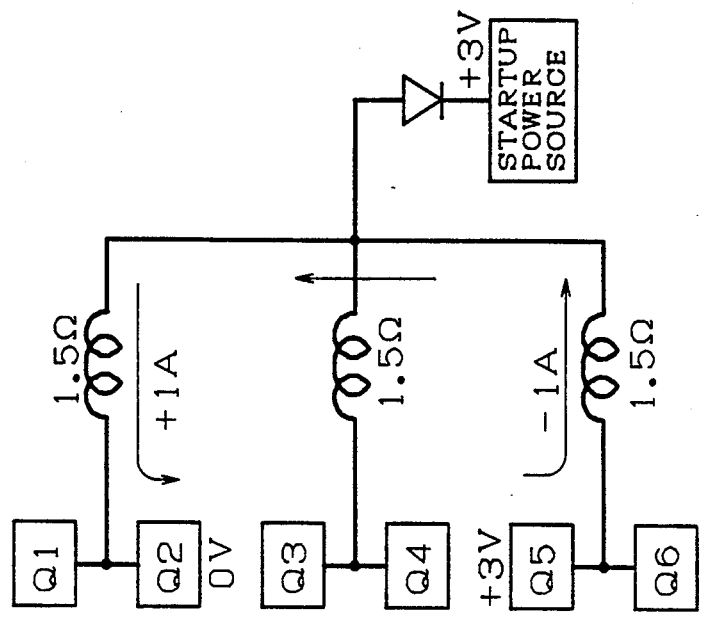
FIGS. 9A and 9B illustrate energizing actions of the fifth embodiment.

More particularly, the neutral point of the three, U,V, and W, phase coils which are connected at the other end to three interfaces between two transistors, Q1 and Q2, Q3 and Q4, and Q5 and Q6 respectively as shown in FIG. 8, is provided to serves as an (a semiconductor device for converting a state function of a system) and coupled by the diode D, which acts as a switch between energizing mode and deenergizing mode, to the start-up source E adapted to receive a supply voltage with a delay of time after the connection to an external power supply.

Figure 9A:
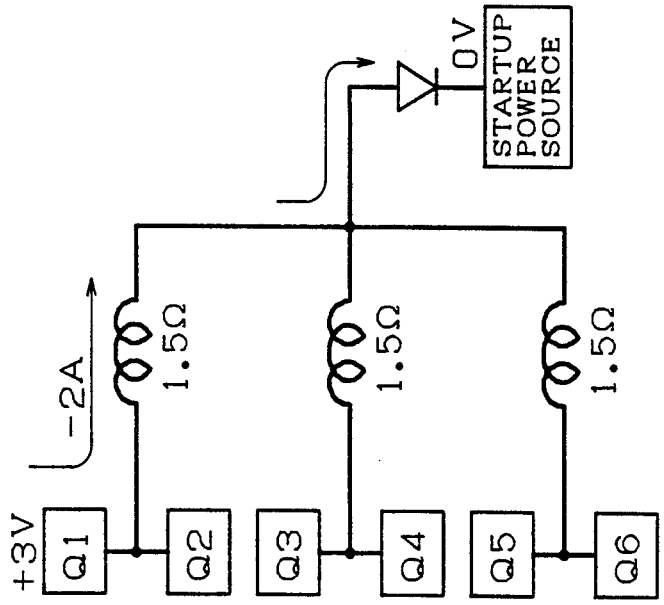
Figure 10:
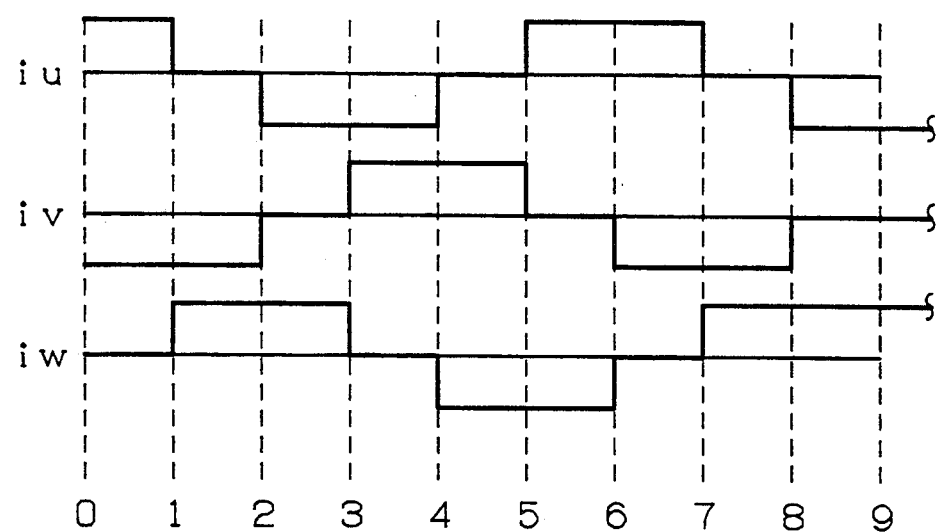
FIG. 10 is a waveform diagram of magnetizing currents according to a prior art method.
Figure 11:
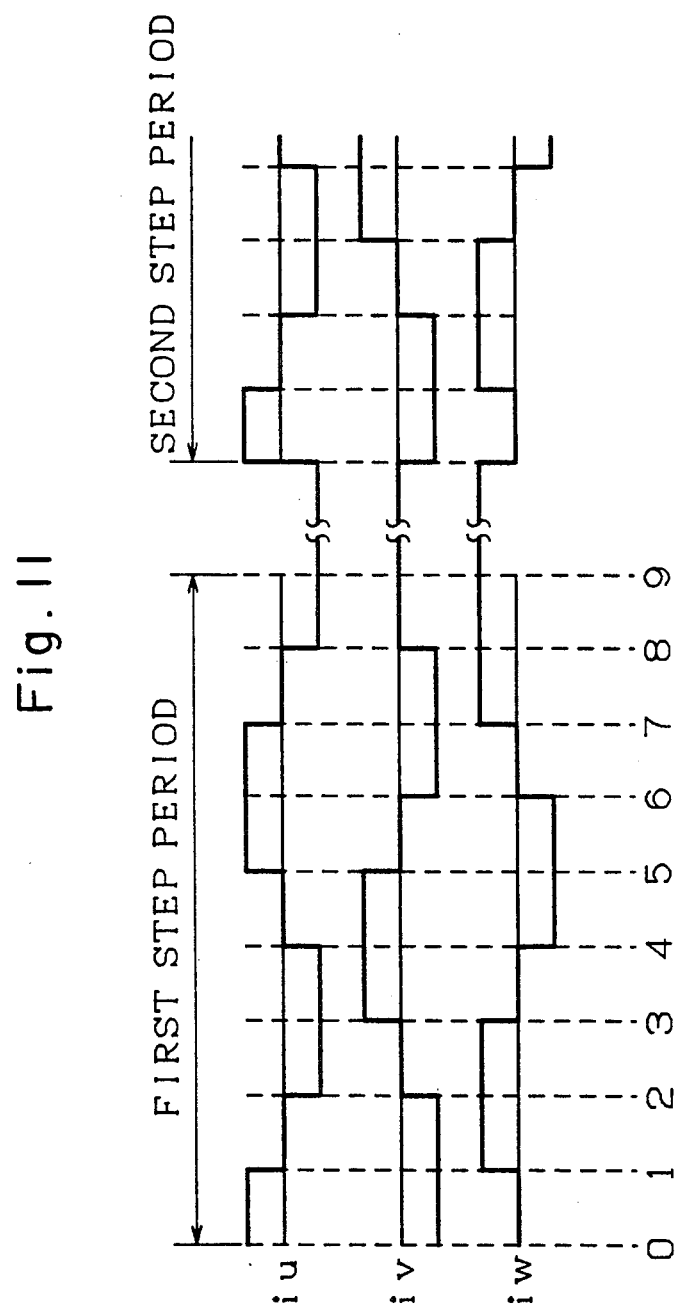
FIG. 11 is a waveform diagram of magnetizing currents showing another prior art method.

For example, when the impedance of each coil is 1.5Ω, the voltage of the start-up source is +3V, and the supply voltage is +3V, a magnetizing current of −2 A is fed to the U phase coil by turning the transistor Q1 on at the preparatory magnetizing stage as shown in FIG. 9A. Then, a magnetizing current of +1 A is fed to the U phase coil and simultaneously, a magnetizing current of −1 A is fed to the W phase coil by turning on the two transistors Q2 and Q5 at the magnetizing shift stage, as shown in FIG. 9B.

Accordingly, the U phase coil is fed with 3A of a current amplitude ranging from −2 A to +1 A which is equal to 1.5 times the full amplitude, 2A, of the conventional method between −1 A and +1 A, thus producing a higher rate of the start-up torque.

As set forth above, the method of starting a sensorless multiphase dc motor of the fifth embodiment ensures the starting of the motor and will thus increase the start-up reliability.

The foregoing embodiments, first to fifth, of the present invention is illustrative but not limitative and other modification and change will be possible without departing the scope and spirit of the present invention.

It would also be understood that the start-up flow chart of the third embodiment, the sensitivity of the fourth embodiment, or the voltage of the start-up source of the fifth embodiment associated with a sensorless multiphase dc motor, for example, may be varied to satisfy desired requirements.

Although the three-phase dc motor was employed in each of the foregoing embodiments for simplicity of the description, another sensorless dc motor of more than three phases will be controlled with equal success for positive start-up action.

Also, the present invention is not limited to such spindle motors as explained in the embodiments for use in known magnetic-disk drive apparatuses and will be applicable to other types of the sensorless multiphase dc motor which can be used in e.g. laser printers.

We claim:

1. A method of starting a sensorless three-phase dc motor which consists mainly of a stator for generating a magnetic field while being magnetized and a rotor for producing a rotating torque by means of electromagnetic interaction with the stator, comprising:

a start-up step for supplying three-phase coils of the stator with discrete magnetizing currents in order to rotate the rotor is a desired direction;

said start-up step containing a magnetizing shift action caused by changing the flow of current from a forward direction to a reverse direction or from the reverse direction to the forward direction instantly with giving no interval of zero-current period; and said magnetizing shift action being conducted on at least two of the three phase coils of the stator.

2. A method of starting a sensorless three-phase dc motor according to claim 1, wherein said magnetizing shift action is conducted on three phase coils respectively.

3. A method of starting a sensorless three-phase dc motor according to claim 1, wherein a preparatory magnetizing action is provide prior to said magnetizing shift action on each of the target phase coils and also, on the remaining phase coil.

4. A method of starting a sensorless three-phase dc motor according to claim 1, wherein a detecting action for detecting the rotating movement of the rotor is conducted after the start-up step.

5. A method of starting a sensorless three-phase dc motor according to claim 4, wherein said start-up step is repeated when a number of rotations of the rotor is smaller than a predetermined number in the detecting action.

6. A method of starting a sensorless multiphase dc motor which consist mainly of a stator for generating a magnetic field while being magnetized and a rotor for producing a rotating torque by means of electromagnetic interaction with the stator, comprising:

energizing multiple phase coils of the stator with discrete magnetizing currents in order to rotate the rotor in a desired direction;

repeating said energizing process plural times, a plurality of said energizing processes being separated from one another by detecting periods for detecting the rotating movement of the rotor; and said energizing process containing a series of magnetizing shift action on each of said phase coils caused by changing the flow of current from a forward direction to a reverse direction or from the reverse direction to the forward direction instantly with giving no interval of zero-current period.

7. A method of starting a sensorless multiphase dc motor according to claim 6, wherein said magnetizing shift action is conducted on at least two of the phase coils simultaneously and two magnetizing currents of their respective phase coils are fed in the opposite directions.

8. A method of starting a sensorless multiphase dc motor according to claim 7, wherein a neutral point of said multi phase coils of the stator is coupled by a diode to a start-up power source so that a supply voltage is fed with a delay of item after the connection to an external power source.

9. A method of starting a sensorless multiphase dc motor according to claim 7, wherein said delay time is assigned for conducting a preparatory magnetizing action prior to said magnetizing shift action.

10. A method of starting a sensorless multiphase dc motor which consists mainly of a stator for generating a magnetic field while being magnetized and a rotor for producing a rotating torque by means of electromagnetic interaction with the stator, comprising:
  energizing multiphase coils of the stator with discrete magnetizing currents in order to rotate the rotor in a desired direction;
  repeating said energizing process plural times;
  said energizing process containing a series of magnetizing shift action on each of said phase coils caused by changing the flow of current from a forward direction to a reverse direction or from the reverse direction to the forward direction instantly with giving no interval of zero-current period; and
  said repeating said energizing process plural times being further characterized in that during said repeating, the amplitude of said magnetizing current is varied by increasing the absolute value of the initial amplitude for conductive a magnetizing shift action to a greater level from that of the previous magnetizing process.

11. A method of starting a sensorless three-phase dc motor according to claim 1, wherein said magnetizing action is conducted on two phase coils simultaneously.

12. A method of starting a sensorless three-phase dc motor according to claim 2, wherein said magnetizing action is conducted on two of the three phase coils simultaneously.

13. A method of starting a sensorless multiphase dc motor which consists mainly of a stator for generating a magnetic field while being magnetized and a rotor for producing a rotating torque by means of electromagnetic interaction with the stator, comprising:
  a start-up step for supplying multiphase coils of the stator with discrete magnetizing currents in order to rotate the rotor in a desired direction;
  said start-up step containing a magnetizing shift action caused by changing the flow of current from a forward direction to a reverse direction or from the reverse direction to the forward direction instantly with giving no interval of zero-current period; and
  said magnetizing shift action being conducted on at least two of the multiphase coils of the stator.

* * * * *

UNITED STATES PATENT AND TRADEMARK OFFICE
CERTIFICATE OF CORRECTION

PATENT NO. : 5,323,094
DATED : June 21, 1994
INVENTOR(S) : Isao Kaneda

It is certified that error appears in the above-indentified patent and that said Letters Patent is hereby corrected as shown below:

On the title page, item [73] Assignee should read:

-- NIPPON DENSAN CORPORATION
552, NIJYODEN-CHO, KARASUMA OIKE AGARU, NAKAKYO-KU, KYOTO 604 JAPAN --

Signed and Sealed this

Eleventh Day of April, 1995

Attest:

BRUCE LEHMAN

Attesting Officer

Commissioner of Patents and Trademarks